United States Patent
Carvalho et al.

(10) Patent No.: US 9,191,095 B1
(45) Date of Patent: Nov. 17, 2015

(54) BI-DIRECTIONAL AMPLIFIER SYSTEM FOR RADIO COMMUNICATION

(71) Applicants: Jeffrey Carvalho, Dighton, MA (US); Ricardo M. Silva, Griswold, CT (US)

(72) Inventors: Jeffrey Carvalho, Dighton, MA (US); Ricardo M. Silva, Griswold, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 85 days.

(21) Appl. No.: 14/163,065

(22) Filed: Jan. 24, 2014

(51) Int. Cl.
*H04M 1/02* (2006.01)
*H04B 7/155* (2006.01)

(52) U.S. Cl.
CPC ..................................... *H04B 7/155* (2013.01)

(58) Field of Classification Search
None
See application file for complete search history.

(56) References Cited

U.S. PATENT DOCUMENTS

| | | | |
|---|---|---|---|
| 2011/0173497 A1* | 7/2011 | Nakatani | G05B 19/0428 714/32 |
| 2012/0139362 A1* | 6/2012 | Fichtlscherer | H01H 47/02 307/113 |
| 2013/0082634 A1* | 4/2013 | Bokusky | G05B 9/02 318/563 |

* cited by examiner

*Primary Examiner* — Bobbak Safaipour
(74) *Attorney, Agent, or Firm* — James M. Kasischke; Michael P. Stanley

(57) ABSTRACT

An amplifier system is provided that can be coupled between a handset and an antenna of a radio frequency (RF) satellite-network communication system. The amplifier system includes a first signal path for amplifying an RF signal received at the antenna when the amplifier system has power supplied thereto. A second signal path is created through the amplifier system when a transmission signal is generated at the handset and the amplifier system has power supplied thereto. A third signal path is created through the amplifier system when no power is supplied thereto. When the third signal path is created, the first signal path and second signal path are disrupted, while the third signal path couples the handset to the antenna.

12 Claims, 3 Drawing Sheets

BI-DIRECTIONAL AMPLIFIER SYSTEM FOR RADIO COMMUNICATION

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates generally to amplifier systems, and more particularly to a bi-directional amplifier system supporting transmit and received signal amplification for half duplex mode operation.

(2) Description of the Prior Art

In some satellite network communication systems, a handset (i.e., any microphone, earpiece and receiver assembly) can be coupled to an antenna via a cable. This is necessary to operate the handset indoors. Many such systems utilize the same frequency for transmit and receive paths in what is known as the half-duplex mode of operation. This is true of the well-known Iridium™ satellite telephone system. In these types of systems, the length of the cable coupling the handset to the antenna in a half-duplex system can be limited by cable losses. Thus, physical constraints imposed by an installation configuration for a half-duplex communication system places a heavy premium (e.g., due to insertion loss limits) on antenna and/or handset placement in order to prevent losses related to cable length. Unfortunately, optimal operational placement is not always compatible with optimal physical placement.

SUMMARY OF THE INVENTION

Accordingly, it is an object of the present invention to provide a bi-directional amplifier for use in a half-duplex mode satellite-network communications system.

Another object of the present invention is to provide a bi-directional amplifier for use in cable-coupling a handset to an antenna for half-duplex operation that facilitates the use of longer-length cables without sacrificing operational effectiveness.

Other objects and advantages of the present invention will become more obvious hereinafter in the specification and drawings.

In accordance with the present invention, an amplifier system is provided that can be coupled between a handset and an antenna of a radio frequency (RF) satellite-network communication system. The amplifier system includes a first signal path for amplifying an RF signal received at the antenna. The first signal path routes the RF signal so-amplified to the handset when the amplifier system has power supplied thereto. A second signal path is created through the amplifier system when a transmission signal is generated at the handset. When this occurs, the first signal path is disrupted and the second signal path amplifies the transmission signal. The second signal path also routes the transmission signal so-amplified to the antenna when the amplifier system has power supplied thereto. A third signal path is created through the amplifier system when no power is supplied thereto. When the third signal path is created, the first signal path and second signal path are disrupted, while the third signal path couples the handset to the antenna.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
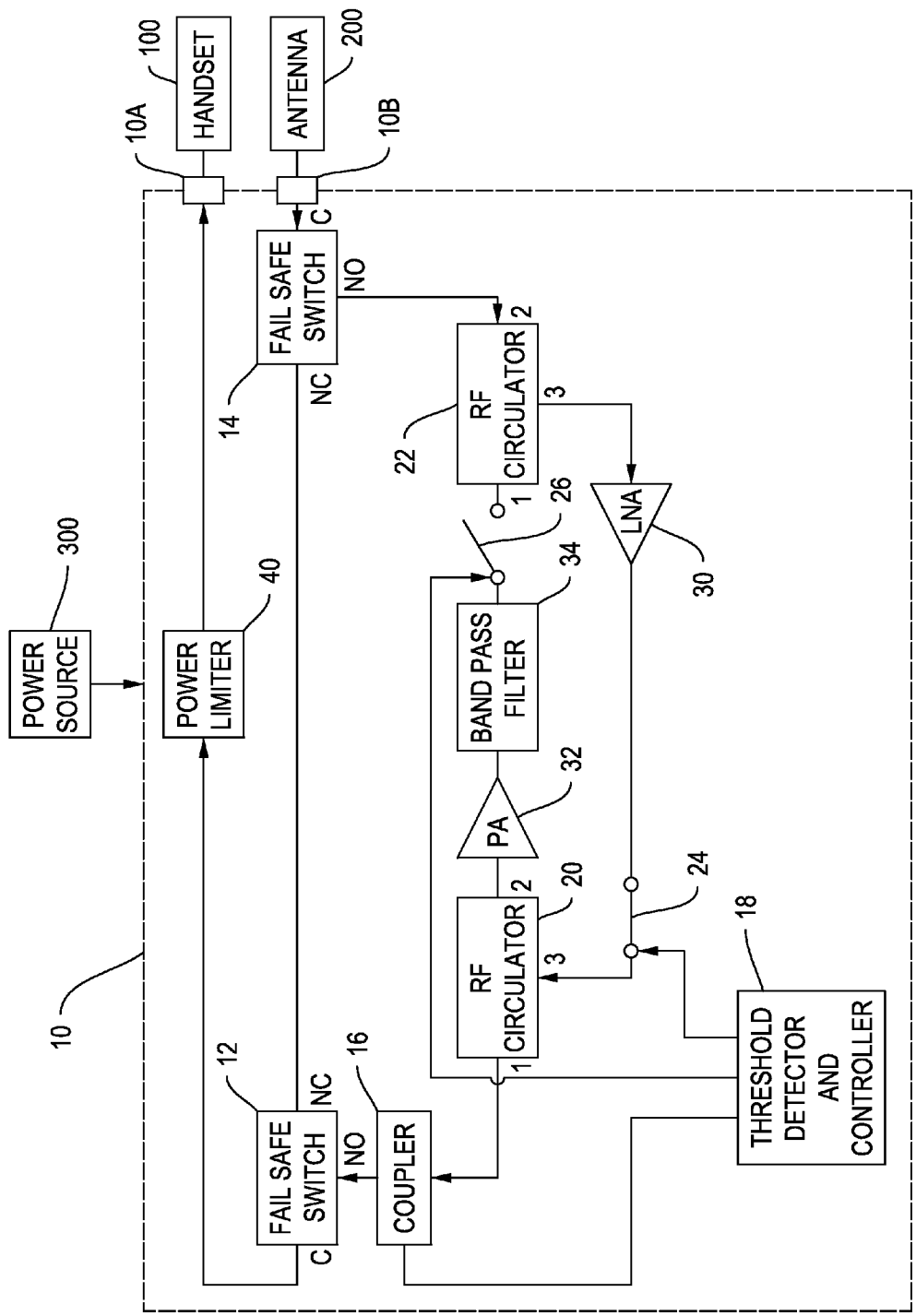
FIG. 1 is a schematic view of a bi-directional amplifier system configured in its default or receive signal mode in accordance with an embodiment of the present invention.

Referring now to the drawings, simultaneous reference will be made to FIGS. 1-3 where a bi-directional amplifier system in accordance with an embodiment of the present invention is shown and is referenced generally by the elements contained within dashed-line box 10. Amplifier system 10 supports the coupling of a handset 100 (coupled to system 10 at a port 10A thereof) to an antenna 200 (coupled to system 10 at a port 10B thereof) of a radio frequency (RF) based satellite-network communication system operating in a half-duplex mode, i.e., the same frequency being used for transmit and receive signal paths. Amplifier system 10 also supports broadband signal throughput via a bypass mode.

As will be explained further below, amplifier system 10 is automatically configured to operate in one of three modes. FIG. 1 illustrates amplifier system 10 configured in its default or receive signal mode. FIG. 2 illustrates amplifier system 10 configured in its transmit signal mode. FIG. 3 illustrates amplifier system 10 in its non-energized or bypass mode. The structure of amplifier system 10 supports all three modes of operation.

Figure 2:
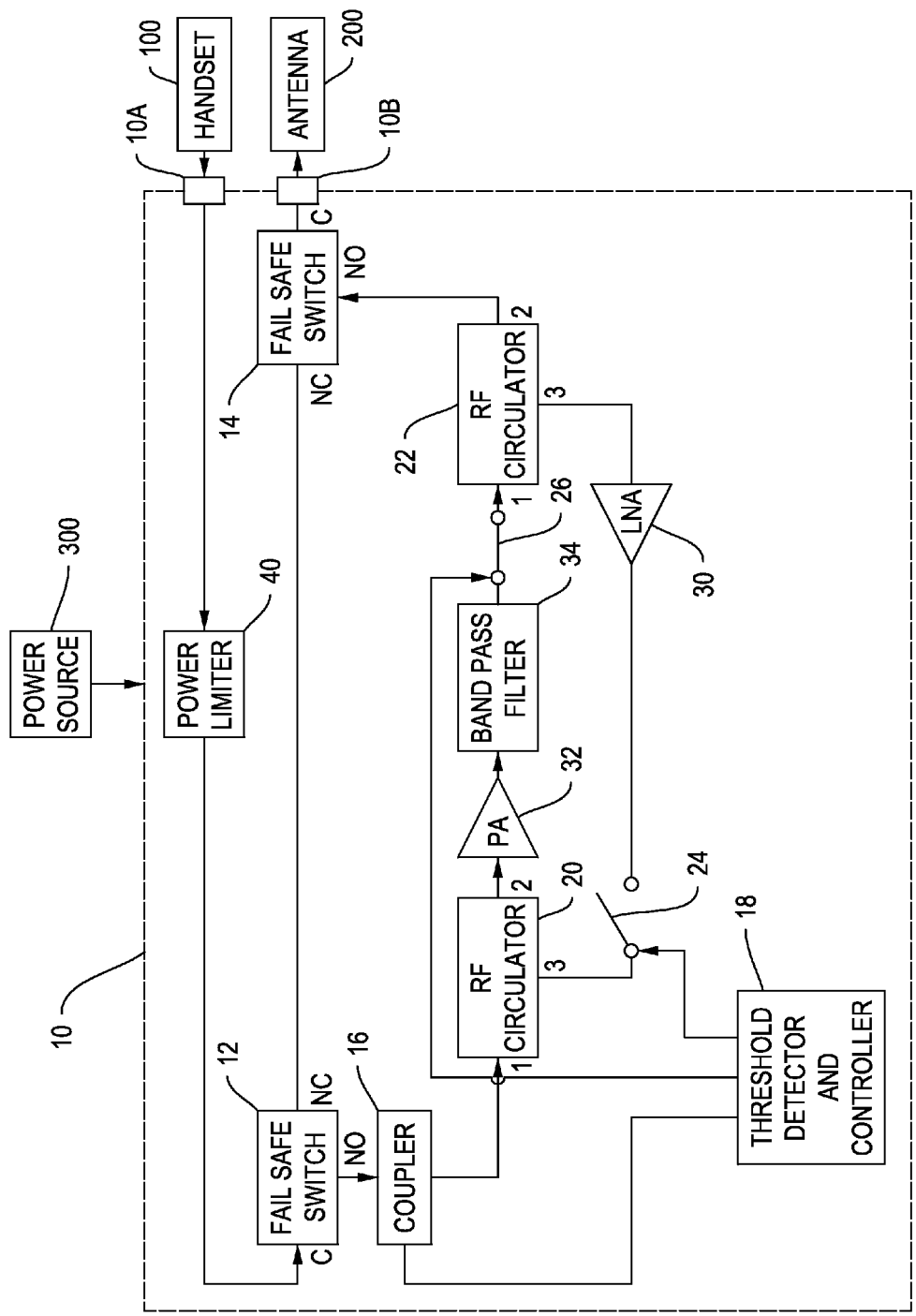
FIG. 2 is a schematic view of the bi-directional amplifier system configured in its transmit signal mode.

Amplifier system 10 includes two energizable fail safe switches (FSS) 12 and 14 that allow amplifier system 10 to be in one of its receive or transmit signal modes when a power source 300 is coupled to amplifier system 10 to energize FSS 12 and 14 as shown in FIGS. 1 and 2. At the same time, FSS 12 and 14 will place amplifier system 10 in its bypass mode (FIG. 3) when power source 300 is uncoupled from amplifier system 10 or is unavailable thereto.

In the illustrated embodiment, each of FSS 12 and 14 can be a single-pole, double-throw switch having a common ("C") port, a normally open ("NO") port, and a normally closed ("NC") port. As is known in the art of such switches, the ports identified by "normally" indicate the particular port's configuration when no power is applied to the switch. Accordingly, the common port is connected to the normally open port when power is supplied to the switch (i.e., as in FIGS. 1 and 2), and the common port is connected to the normally closed port when the switch is not energized (i.e., as in FIG. 3).

Between FSS 12 and 14, amplifier system 10 defines two signal amplification paths. One signal path (referred to hereinafter as the receive signal path) provides amplification of signals received by antenna 200 for presentation to handset 100. The other signal path (referenced hereinafter as the transmit signal path) provides amplification of signals generated at handset 100 that must be presented to antenna 200 for transmission therefrom. When power is supplied to amplifier system 10, one of these two signal amplification paths is completed while the other is disrupted.

Each of the receive signal path and transmit signal path extends between the normally open port of FSS 12 and the normally open port of FSS 14. Each signal path includes a coupler circuit 16 coupled to the normally open port of FSS 12, a signal or threshold detector and controller 18 coupled to coupler circuit 16, a first RF circulator 20 coupled to coupler circuit 16, and a second RF circulator 22 coupled to the normally open port of FSS 14. Detector and controller 18 monitors signal passage through coupler circuit 16 and uses the results of such monitoring to complete and disrupt the appropriate signal amplification paths. Briefly, detector and controller 18 has a default condition that completes the receive signal path and disrupts the transmit signal path at all times unless a transmit signal (from handset 100) is detected at coupler circuit 16. When such a transmit signal is detected (e.g., via threshold detection), the transmit signal path is completed, and the receive signal path is disrupted.

RF circulators 20 and 22 are each three-port devices operating in a "clockwise manner". That is, each of RF circulators 20 and 22 supports signal movement from ports 1-to-2, ports 2-to-3, and ports 3-to-1, while not supporting signal movement from ports 2-to-1, ports 1-to-3, and ports 3-to-2. Such RF circulators and their connections in circuits/systems are well understood in the art.

Completion and disruption of receive and transmit signal paths is accomplished by using detector and controller 18 to control switches 24 and 26 disposed in the receive and transmit signal paths. More specifically, a switch 24 is disposed in the receive signal path, and a switch 26 is disposed in the transmit signal path. In the default receive mode when no transmit signal is present, controller 18 closes switch 24 and opens switch 26. Thus, when a signal is received at antenna 200 and power is supplied to amplifier system 10 as shown in FIG. 1, the received signal is routed through ports 2-to-3 of RF circulator 22 for amplification by (for example) a low-noise amplifier ("LNA") 30. The amplified received signal is passed through closed switch 24 and is routed through ports 3-to-1 of RF circulator 20, coupler circuit 16, and FSS 12 for presentation to handset 100. A power limiter 40 can be disposed between the common port of FSS 12 and handset 100 in order to protect power amplifier 32 from excessive power originating from any transmission device coupled to port 10A. For example, when handset 100 is coupled to port 10A, input power fluctuations can be expected depending on the length of the cable used to connect handset 100 to port 10A.

In the transmit mode, when a transmit signal is detected at coupler circuit 16, detector and controller 18 opens switch 24 and closes switch 26 as illustrated in FIG. 2. Thus, when a signal to be transmitted (or transmit signal) is generated at handset 100 and power is supplied to amplifier system 10 as shown in FIG. 2, the transmit signal is routed through ports 1-to-2 of RF circulator 20 for amplification by (for example) a power amplifier 32. The amplified transmit signal can be band pass limited by a bandpass filter 34 that prevents unwanted harmonics (that can be generated by power amplifier 32) from radiating through amplifier system 10. The transmit signal is then passed through closed switch 26 and is routed through ports 1-to-2 of RF circulator 22 for presentation to antenna 200.

Figure 3:
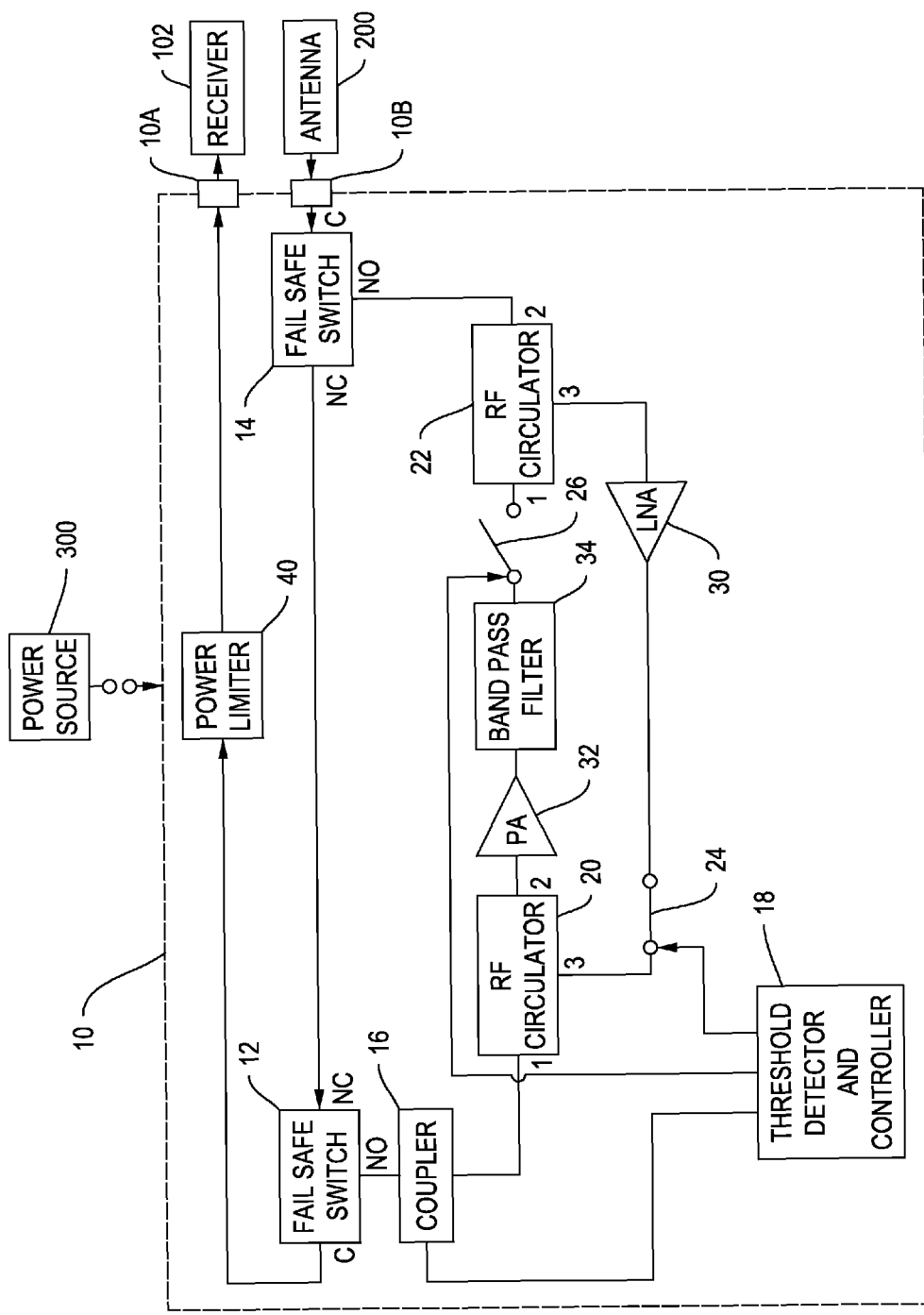
FIG. 3 is a schematic view of the bi-directional amplifier system configured in its non-energized or bypass mode.

The third mode of operation for amplifier system 10 is the bypass mode illustrated in FIG. 3. In this mode, there is no power supplied to amplifier system 10. The removal or absence of such power can be intentional or accidental without departing from the scope of the present invention. The removal of power from FSS 12 and 14 causes each FSS's common port to be coupled to its normally closed port. When this occurs, signal movement between ports 10A and 10B is supported only by FSS 12 and 14 (and power limiter 40 if present). The resulting bypass signal path is broadband in nature because there are no filters, amplifiers, etc., increasing the frequency range of operation. Accordingly, amplifier system 10 could remain in the loop between antenna 200 and (for example) a receiver 102 which can include a GPS receiver or any other device not requiring amplification coupled to port 10A.

The advantages of the present invention are numerous. The amplifier system re-amplifies RF signals bi-directionally to thereby reduce the impact of cable length used to couple a handset to an antenna for an RF-based satellite-network communication system operating in the half-duplex mode. The amplifier system defaults to a receive signal state but additionally re-configures to a transmit signal state when needed. The bypass mode allows the amplifier system to be used with broadband transmit/receive devices.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An amplifier system adapted to be coupled between a handset and an antenna of a radio frequency communication system, said amplifier system comprising:
    a first signal path amplifying an RF signal received at the antenna and adapted to route said amplified RF signal to the handset when said amplifier system has power supplied thereto;
    a second signal path created when a transmission signal is generated at the handset wherein said first signal path is disrupted, said second signal path amplifying said transmission signal and adapted to route said amplified transmission signal to the antenna when said amplifier system has power supplied thereto; and
    a third signal path created when no power is supplied to said amplifier system wherein said first signal path and said second signal path are disrupted, and wherein said third signal path is adapted to couple the handset to the antenna.

2. A system as in claim 1, wherein said first signal path, said second signal path, and said third signal path include:
    a first fail safe switch adapted to be coupled to the handset; and
    a second fail safe switch adapted to be coupled to the antenna.

3. A system as in claim 1, wherein said first signal path and said second signal path include RF circulators.

4. A system as in claim 2, wherein said first signal path and said second signal path include RF circulators.

5. A system adapted to be coupled between a handset and an antenna of a radio frequency (RF) satellite-network communication system, said amplifier system comprising:
    a first fail safe switch (FSS) having a common port adapted to be coupled to the handset, a normally open port, and a normally closed port;
    a second FSS having a common port adapted to be coupled to the antenna, a normally open port, and a normally closed port coupled to said normally closed port of said first FSS;

a first signal path coupled between said normally open port of said first FSS and said normally open port of said second FSS, said first signal path amplifying an RF signal received at the antenna and adapted to route said amplified RF signal to the handset via said first FSS when said amplifier system has power supplied thereto; and a second signal path coupled between said normally open port of said first FSS and said normally open port of said second FSS, said second signal path created when a transmission signal is generated at the handset wherein said first signal path is disrupted, said second signal path amplifying said transmission signal and adapted to route said amplified transmission signal to the antenna via said second FSS when said amplifier system has power supplied thereto.

6. A system as in claim 5, further comprising:
a first switch disposed in said first signal path;
a second switch disposed in said second signal path; and
a controller coupled to said normally open port of said first FSS, said first switch, and said second switch, said controller opening said first switch and closing said second switch when said transmission signal is present, and said controller closing said first switch and opening said second switch when said transmission signal is not present.

7. A system as in claim 5, wherein said first signal path and said second signal path include RF circulators.

8. A system as in claim 6, wherein said first signal path and said second signal path include RF circulators.

9. A system for use with a radio frequency (RF) satellite-network communication system, said amplifier system comprising:
a first fail safe switch (FSS) having a common port, a normally open port, and a normally closed port;
a second FSS having a common port, a normally open port, and a normally closed port coupled to said normally closed port of said first FSS;
a first signal path coupled between said normally open port of said first FSS and said normally open port of said second FSS, said first signal path amplifying a first signal received at said normally open port of said second FSS and routing said amplified first signal to said normally open port of said first FSS when said amplifier system has power supplied thereto; and
a second signal path coupled between said normally open port of said first FSS and said normally open port of said second FSS, said second signal path created when a second signal is detected at said normally open port of said first FSS wherein said first signal path is disrupted, said second signal path amplifying said second signal and routing said amplified second signal to said normally open port of said second FSS when said amplifier system has power supplied thereto.

10. A system as in claim 9, further comprising:
a first switch disposed in said first signal path;
a second switch disposed in said second signal path; and
a controller coupled to said normally open port of said first FSS, said first switch, and said second switch, said controller opening said first switch and closing said second switch when said second signal is present, and said controller closing said first switch and opening said second switch when said second signal is not present.

11. A system as in claim 9, wherein said first signal path and said second signal path include RF circulators.

12. A system as in claim 10, wherein said first signal path and said second signal path include RF circulators.

\* \* \* \* \*